Patented Feb. 17, 1948

2,436,253

UNITED STATES PATENT OFFICE 2,436,253

COMPOSITION COMPRISING A POLYVINYL ACETAL RESIN STABILIZED WITH A BASIC ALKALI METAL COMPOUND AND AN AMINE SALT

Richard D. Dunlop, Longmeadow, Mass., assignor to Monsanto Chemical Company, St. Louis, Mo., a corporation of Delaware No Drawing. Application October 23, 1944, Serial No. 560,038

14 Claims. (Cl. 260—73)

1

This invention relates to polyvinyl acetal resin compositions and, more particularly, to polyvinyl acetal resin compositions which may be employed as safety glass interlayer material.

Polyvinyl acetal resins may be prepared by various methods. One method, for example, comprises reacting an aldehyde with a product of hydrolysis of a polyvinyl ester in the presence of a solvent for the product and a mineral acid catalyst, for example, sulphuric acid, and then precipitating the resin with water or other non-solvent. Other reaction conditions may be employed in forming polyvinyl acetal resins, but generally a mineral acid catalyst such as sulphuric acid, phosphoric acid, hydrochloric acid and the like, is used to accelerate the acetalization reaction. The crude resins obtained by such processes, even after repeated washings with water, have poor stability in that they badly discolor at elevated temperatures.

It has been proposed to overcome the heat instability of such resins by treatment with alkaline materials such as potassium hydroxide. Such a process is described, for example, in U. S. 2,258,410 and U. S. 2,282,057 and is effective in producing polyvinyl acetal resins which are sufficiently heat stable for processing purposes, particularly when an excess of alkaline material is left in the resin. Such a product has proved to be adaptable for many purposes, for example, in preparing interleaf material for safety glass. However, it has been found that compositions comprising such stabilized polyvinyl acetal resins have certain disadvantages as compared with compositions made from unstabilized resin. For example, interleaf compositions comprising such resins have a substantially reduced adhesion to glass, a disadvantage which is particularly accentuated when even traces of moisture are present in the plastic such as may result from exposure to humid atmospheric conditions. Thus, a substantial decrease in adhesion is noted on increasing the moisture content from the range within which it is usually maintained, namely, less than 0.4%, up to 0.6-1.0% or above. Also, outside exposure of laminated glass bonded with interleaf compositions comprising such resins, tends to result in separation of the plastic from the glass, particularly around the edges. This characteristic does not appear to be influenced by the original moisture content of the plastic.

It is an object of this invention to provide improved polyvinyl acetal resins. It is a particular object of this invention to overcome disadvantages in polyvinyl acetal resins stabilized with alkali metal hydroxides or salts thereof made with weak acids.

These and other objects are attained, according to this invention, by incorporating an amine salt with a polyvinyl acetal resin having an "alkaline titer" as a result of the association therewith of a basic-reacting alkali metal compound.

More particularly, according to the present invention, an improved resin composition is prepared by incorporating a suitable amount of an amine salt, and preferably, an amine salt of a strong acid, with a polyvinyl acetal resin which has been stabilized with an alkali metal hydroxide or a basic-reacting salt thereof. By the term "strong acid" as employed herein, is meant an acid possessing an ionization constant of at least one hydrogen that is greater than $1 \times 10^{-4}$ at 25° C., for example, sulphuric acid, phosphoric acid, phthalic acid and the like. Furthermore, according to the present invention, it has been found that amine salts of long chain aliphatic acids, for example, amine salts of such a dibasic long chain aliphatic acid as sebacic acid, show exceptional advantages when added to polyvinyl acetal resins stabilized with alkali metal hydroxides or basic-reacting salts thereof.

In order to illustrate the present invention, the following specific examples are given. It is understood that these examples are illustrative and not limitative of the present invention. The parts are by weight in all examples.

The polyvinyl acetal resin employed in Examples I, II, III and IV was prepared in the following manner. Vinyl acetate was suitably polymerized to such a degree that a 1-molar benzene solution possessed a viscosity of substantially 50 centipoises at 20° C. The resulting polyvinyl acetate was then hydrolyzed in a well-known manner, for example, in the presence of sulphuric acid, and the polyvinyl alcohol, so formed, reacted with butyraldehyde in the presence of ethanol and a suitable quantity of sulphuric acid. Thereafter, the polyvinyl acetal, so formed, was precipitated in granular form by the addition of water and washed with water until substantially all of the ethanol was removed from the resin granules. The resinous product at this stage possessed poor heat stability even after repeated washing with water.

In order to heat-stabilize the product, the following general procedure was followed. A slurry of the resin granules with an aqueous solution containing about 40% ethanol was heated with stirring at about 45° C. At the start of this heating period sufficient potassium hydroxide was added to the slurry to produce the desired alkalinity. During the heating period portions of the slurry were removed periodically and tested for alkalinity. Further additions of potassium hydroxide were made as needed to maintain the mixture at the desired alkalinity. After about 3 hours heating, the slurry was found to have a substantially constant alkalinity. Following the above treatment, the suspending medium was drawn off and the resin washed with water until substantially all of the ethanol had been removed from the resin granules which were then dried at a moderately raised temperature, e. g., 70° C.

The resin used in Examples I–IV was stabilized in the presence of such an amount of potassium hydroxide that the final product had an "alkaline titer" of about 30. This was determined by forming a 3% solution of a portion of the resin in ethanol and measuring the number of cubic centimeters of 0.01N hydrochloric acid solution required to neutralize the solution using brom-phenol blue as an indicator. The "titer" was the number of cubic centimeters of 0.01N hydrochloric acid solution required to neutralize 100 grams of the resin. The resin was found to possess good heat stability, only a slight yellow discoloration occurring after two hours heating in a circulating air oven at 160° C. The polyvinyl butyraldehyde acetal resin so formed was found to contain substantially 17–22% hydroxyl groups, calculated as polyvinyl alcohol, less than 3% ester groups calculated as polyvinyl acetate and the balance substantially acetal.

The adhesion results given in the following examples were obtained by laminating sheets of the polyvinyl acetal resin compositions substantially 0.015 inch in thickness between sheets of plate glass substantially ⅛ inch in thickness in a well-known manner, cooling the resulting laminated safety glass to substantially 0° F. and then shattering the glass with hammer blows. In order to accentuate the improved characteristics of the products of this invention, moisture contents corresponding to substantially 0.6–1.0% water were maintained in all of the polyvinyl acetal resin compositions including control Batch A. The evaluation of the adhesion characteristics of each resin composition was made by noting the proportion of the glass particles that failed to adhere to the resin composition.

*Example I*

| Batch | Resin | Plasticizer | Triamyl Amine Sulfate | Adhesion to Glass |
|---|---|---|---|---|
| | *Parts* | *Parts* | *Parts* | |
| A | 600 | 270 | | Very poor. |
| B | 600 | 270 | 0.28 | Fair. |
| C | 600 | 270 | 0.57 | Excellent. |
| D | 600 | 270 | 0.85 | Do. |

In the foregoing example, the triamyl amine sulfate was formed in situ in the plasticizer by dissolving substantially the required amounts of sulfuric acid and triamyl amine in the plasticizer which, in this example, was the triethylene glycol ester of cocoanut oil acids described in United States Patent 2,194,013. The resulting solutions were then incorporated in the polyvinyl acetal resin by means of suitable mixing equipment, for example, a Banbury mixer. The resin compositions so formed were pressed into blocks, the resulting blocks cut into sheets and laminated glass containing these sheets prepared and tested as indicated hereinbefore.

The results obtained with the foregoing series of compositions readily show the marked effect of triamyl amine sulfate in improving the adhesion to glass of a polyvinyl acetal resin-plasticizer composition otherwise possessing poor adhesion to glass.

*Example II*

The series of compositions given below was prepared and tested for adhesion to glass in the same manner as the compositions in Example I. The plasticizer was the above-mentioned triethylene glycol ester of cocoanut oil acids in "E," triethylene glycol dihexoate in "F," and dibutyl sebacate in "G."

| Batch | Resin | Plasticizer | Triamyl Amine Sulfate | Adhesion to Glass |
|---|---|---|---|---|
| | *Parts* | *Parts* | *Parts* | |
| E | 600 | 270 | 1.25 | Excellent. |
| F | 600 | 270 | 1.25 | Do. |
| G | 600 | 270 | 1.25 | Do. |

It can readily be seen from the above results that the plasticizer in the resin composition may be widely varied without detracting from the outstanding adhesion to glass obtained by the addition of triamyl amine sulfate to the resin composition.

*Example III*

The following compositions illustrate the use of triamyl amine salts of other acids than sulfuric acid according to this invention. The plasticizer employed and the method of preparing and testing the compositions was the same as given in Example I.

| Batch | Resin | Plasticizer | Amine Salt | Adhesion to Glass |
|---|---|---|---|---|
| | *Parts* | *Parts* | | |
| H | 600 | 270 | Triamyl amine phosphate, 1.73 parts. | Excellent. |
| I | 600 | 270 | Triamyl amine sebacate, 1.46 parts. | Good. |
| J | 600 | 270 | Triamyl amine benzene sulfonate, 1.38 parts. | Do. |

*Example IV*

In the following polyvinyl acetal resin compositions, the plasticizer and method of preparing and testing of the compositions was the same as in Example I with the exception that triamyl amine was replaced by other amines in preparing the amine salts.

| Batch | Resin | Plasticizer | Amine Salt | Adhesion to Glass |
|---|---|---|---|---|
| | *Parts* | *Parts* | | |
| K | 600 | 270 | Aniline Sulfate, 0.64 part | Excellent. |
| L | 600 | 270 | Diethanol amine Sulfate, 0.70 part | Good. |
| M | 600 | 270 | Amyl Amine sulfate, 0.62 part. | Excellent. |
| N | 600 | 270 | Cyclohexyl Amine Sulfate, 0.67 part. | Do. |
| O | 600 | 270 | N-butyl Diethanol amine sulfate, 0.94 part. | Do. |
| P | 600 | 270 | Dimethyl-dibenzyl ammonium sulfate, 1.23 parts. | Do. |

*Example V*

This example illustrates the invention as applied to a resin having a high "alkaline titer."

The polyvinyl acetal resin was prepared in the same manner as the resin used in Examples I–IV inclusive, except that sufficient potassium hydroxide was used to given an "alkaline titer" of about 250. The same plasticizer was used in the same amount as in Example I and the components of the composition were combined in the same manner.

It was found that batch Q in which was incorporated 6.9 parts of triamyl amine sulfate for every 600 parts of resin possessed excellent adhesion to glass, whereas an otherwise identical batch R containing 1.25 parts of triamyl amine sulfate for every 600 parts of resin possessed poor adhesion to glass and an otherwise identical batch S, containing no triamyl amine sulfate possessed very poor adhesion to glass.

Furthermore, outside exposure tests showed that laminated glass bonded with batch Q was substantially unaffected over a long period of time whereas batch S showed separation of the plastic from the glass within a relatively short time.

In addition to the advantages set forth hereinbefore, it has been found that safety glass containing as the interlayer the compositions of the invention set forth in Examples I-V possesses in general, the desirable properties of safety glass previously obtained. Thus, for example, safety glass containing as the interlayer the compositions of the invention in Examples I-V was found to possess a high resistance to breakage, both at high and low temperatures when tested in a manner well known to those skilled in the art. An added advantage of safety glass containing as the interlayer the compositions of the invention set forth in Examples I-V resides in the resistance to separation of the glass from the interlayer on aging.

Accordingly, from the results obtained with the various illustrative compositions given in Examples I-V, the advantages of the present invention can be readily seen.

This invention is not limited as to the polyvinyl acetal resin employed or its method of preparation. Thus, in the preparation of the resin given hereinbefore, the vinyl acetate may be replaced by other suitable vinyl esters, such as vinyl formate, vinyl propionate and the like. In addition, the degree of polymerization of the vinyl acetate or other vinyl ester may be widely varied. In place of butyraldehyde, other carbonyl-containing compounds may be employed, as for example, formaldehyde, acetaldehyde, propionaldehyde, valeraldehyde, crotonaldehyde, acetone, cyclohexanone, and the like and mixtures thereof. Furthermore, the polyvinyl acetal resin is not limited to any specific hydroxyl, ester or acetal group content.

The present invention is applicable generally to polyvinyl acetal resins having an excess of basic-reacting alkali metal compounds associated therewith as evidenced by an "alkaline titer" as described hereinbefore. U. S. 2,258,410 and U. S. 2,282,057 set forth various typical alternatives in treating polyvinyl acetal resins with alkali metal compounds. However, the present invention is not necessarily limited to resins treated in the particular manner set forth in the examples and the patents referred to above. In general, the resins used have an "alkaline titer" of at least 10 and usually not over 100. A preferred range of titers comprises the range 20–50.

Within the scope of this invention are polyvinyl acetal resins that have been stabilized with basic-reacting alkali metal compounds generally. In place of potassium hydroxide, other hydroxides of the alkali metals may be used such as the hydroxides of sodium, rubidium or cesium. In place of alkali metal hydroxides, basic-reacting salts of the alkali metals may be used, particularly salts of water-soluble acids. Examples of basic-reacting salts of alkali metals are alkali metal salts of carbonic acid, formic acid, acetic acid, propionic acid, butyric acid, benzoic acid, boric acid, citric acid, fumaric acid, lactic acid, maleic acid, malic acid, malonic acid, oxalic acid, phthalic acid, succinic acid, salicylic acid, tartaric acid, valeric acid and the like. When a steeping process is used in which a weak organic acid is employed in the steeping liquid, it is generally preferred to use the corresponding alkali metal salt as the alkali stabilizer as pointed out in U. S. 2,258,410.

The composition of the amine salts may be widely varied as is apparent from the illustrative examples given hereinbefore. Thus, included within the scope of this invention are the amine salts prepared from primary, secondary and tertiary amines and the ammonium bases derived therefrom, quaternary ammonium bases, substituted amines, alkamines, the polyamines, including such substances as mono-, di- and triethanol amines, ethylene diamine, cyclohexyl amine, dicyclohexyl amine and the like. In addition, various types of acids, as hereinbefore indicated, may be employed in preparing the amine salts. Thus generally, mono- and poly-basic organic and inorganic acids may be employed, for example, sulfuric acid, phosphoric acid, sebacic acid, benzene sulfonic acid, phthalic acid, hydrochloric acid, acetic acid, propionic acid, butyric acid, isovaleric acid and succinic acid. It may also be advantageous to have a present a small amount of an amine in the compositions of this invention, for example, from 0.1% to 1% of amine based on the amount of polyvinyl acetal resin. This may be added along with the amine salt, when desired. When advantageous, mixtures of amine salts may be employed according to this invention.

The amount of amine salt that is employed according to this invention may be substantially varied but preferably is an amount based on the amount of combined acid in the salt that is at least equivalent to the alkaline titer of the resin, and preferably in excess of such an amount. Generally, not more than 100% excess is used and from 40 to 60% is usually desirable. However, larger amounts are not precluded, e. g., an excess of 300–400% or more.

In place of forming the amine salt in situ in the plasticizer and then incorporating the mixture of plasticizer and amine salt in the polyvinyl acetal resin, other methods of incorporating the amine salt may be used, for example, the amine salt may be prepared separately and then incorporated with the resin, for example, while in solution in a plasticizer or a solvent for the resin, or the amine salt may be mixed with the resin while the resin is in a heat softened condition.

When the compositions of the present invention are to be employed in forming interlayer material for safety glass, they may be processed in any suitable manner, for example, by cutting sheets of the desired thickness from suitably prepared press blocks, by extrusion in the absence of a solvent, by depositing a solution of the composition in a suitable solvent on a suitable base and then removing the solvent or by pressing a suitable amount of the composition between sheets of glasses, etc.

This application is a continuation-in-part of my co-pending application Ser. No. 412,107, filed September 24, 1941, now abandoned.

It is to be understood that the description of this invention is illustrative thereof and that variations may be made within the scope of the invention as defined in the appended claims.

I claim:

1. A composition comprising a polyvinyl acetal resin, a solution thereof being alkaline to bromphenol blue as a result of having associated therewith a basic alkali metal compound from the group consisting of alkali metal hydroxides and basic alkali metal salts, and an amount of an amine salt such that there is sufficient combined acid therein to be chemically equivalent to the alkalinity of the resin.

2. A product as defined in claim 1 in which the amine salt is an amine salt of a strong acid having an ionization constant of at least one hydrogen that is greater than $1 \times 10^{-4}$ at 25° C.

3. A composition comprising a plasticized polyvinyl acetal resin stabilized by treatment with potassium hydroxide, so that a solution of the resin is alkaline to brom-phenol blue, and an amount of an amine salt of a strong acid having an ionization constant of at least one hydrogen that is greater than $1 \times 10^{-4}$ at 25° C., such that there is sufficient combined acid therein to be chemically equivalent to the alkalinity of the resin.

4. A product as defined in claim 1 in which the resin is a polyvinyl butyraldehyde acetal resin.

5. A product as defined in claim 1 in which the resin is a polyvinyl butyraldehyde acetal resin and the amine salt is an amine salt of a strong acid having an ionization constant of at least one hydrogen that is greater than $1 \times 10^{-4}$ at 25° C.

6. A product as defined in claim 3 in which the resin is a polyvinyl butyraldehyde acetal resin.

7. A product as defined in claim 1 in which the amine salt is triamyl amine sulfate.

8. A product as defined in claim 1 in which the resin is a polyvinyl butyraldehyde acetal resin and the amine salt is triamyl amine sulfate.

9. A product as defined in claim 3 in which the amine salt is triamyl amine sulfate.

10. A product as defined in claim 3 in which the resin is a polyvinyl butyraldehyde acetal resin and the amine salt is triamyl amine sulfate.

11. A composition comprising a polyvinyl acetal resin, a solution of 100 grams thereof requiring 10–100 cc. of 0.01N HCl for neutralization using brom-phenol blue indicator as a result of having been stabilized by treatment with potassium hydroxide, and an amount of an amine salt such that there is sufficient combined acid therein to be chemically equivalent to the alkalinity of the resin.

12. A composition as defined in claim 11 in which the combined acid content of the amine salt does not exceed four times the amount chemically equivalent to the alkalinity of the resin.

13. A composition as defined in claim 11 in which the acetal resin is a polyvinyl butyraldehyde acetal resin.

14. A composition as defined in claim 11 in which the acetal resin is a polyvinyl butyraldehyde acetal resin, the amine salt is triamyl amine sulfate and in which the combined acid content of the triamyl amine sulfate does not exceed four times the amount chemically equivalent to the alkalinity of the resin.

RICHARD D. DUNLOP.

REFERENCES CITED

The following references are of record in the file of this patent:

UNITED STATES PATENTS

| Number | Name | Date |
|---|---|---|
| 2,120,628 | Reid | June 14, 1938 |
| 2,146,735 | Hale | Feb. 14, 1939 |
| 2,216,020 | Nordlander | Sept. 24, 1940 |

OTHER REFERENCES

Hackh, Chemical Dictionary, page 859, third edition, The Blakiston Company, Philadelphia, 1944.